No. 637,831. Patented Nov. 28, 1899.
A. W. ROBINSON.
CUTTER HEAD FOR DREDGES.
(Application filed May 21, 1898.)
(No Model.) 2 Sheets—Sheet 1.

Witnesses:
Edward T. Wray,
Harry B. White.

Inventor:
Arthur W. Robinson,
By Francis W. Parker,
Atty.

No. 637,831. Patented Nov. 28, 1899.
A. W. ROBINSON.
CUTTER HEAD FOR DREDGES.
(Application filed May 21, 1898.)
(No Model.) 2 Sheets—Sheet 2.

Witnesses:
Edward T. Wray.
Harry R. White.

Inventor:
Arthur W. Robinson
By Francis W. Parker.
Atty.

UNITED STATES PATENT OFFICE.

ARTHUR W. ROBINSON, OF MILWAUKEE, WISCONSIN.

CUTTER-HEAD FOR DREDGES.

SPECIFICATION forming part of Letters Patent No. 637,831, dated November 28, 1899.

Application filed May 21, 1898. Serial No. 681,370. (No model.)

*To all whom it may concern:*

Be it known that I, ARTHUR W. ROBINSON, a citizen of the Dominion of Canada, residing at Milwaukee, in the county of Milwaukee and State of Wisconsin, have invented a certain new and useful Improvement in Cutter-Heads for Dredges, of which the following is a specification.

My invention relates to cutting or stirring devices for dredges and the like, and has for its object to provide a new and improved device of this description.

My invention is illustrated in the accompanying drawings, wherein—

Figure 1:
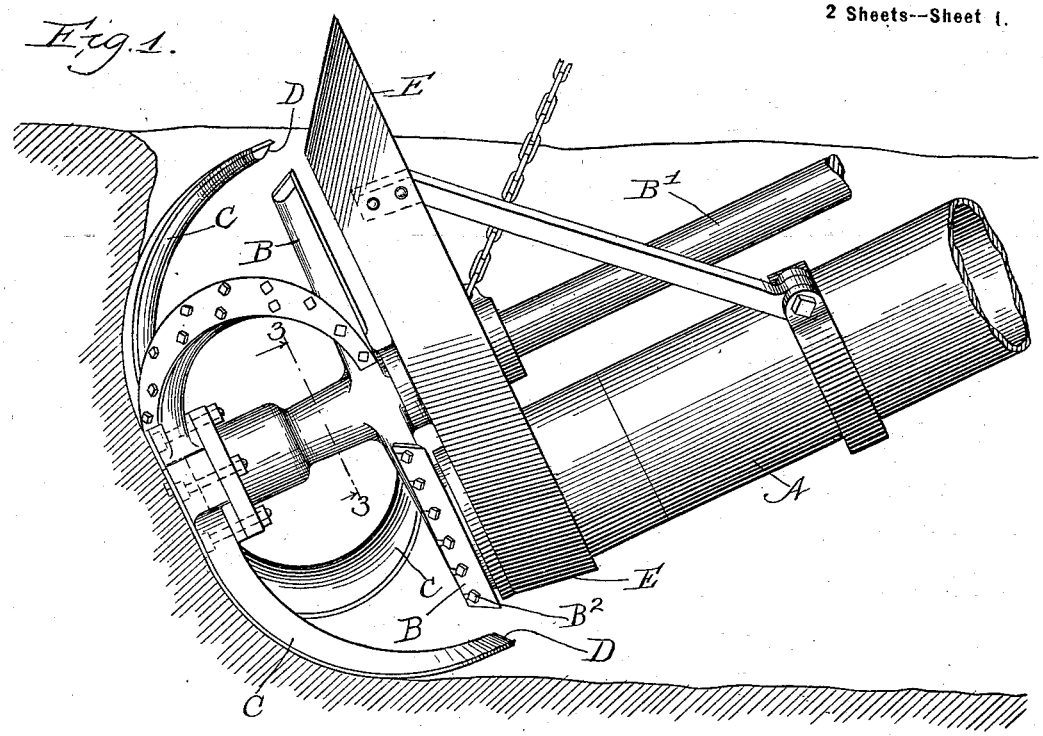
Figure 2:
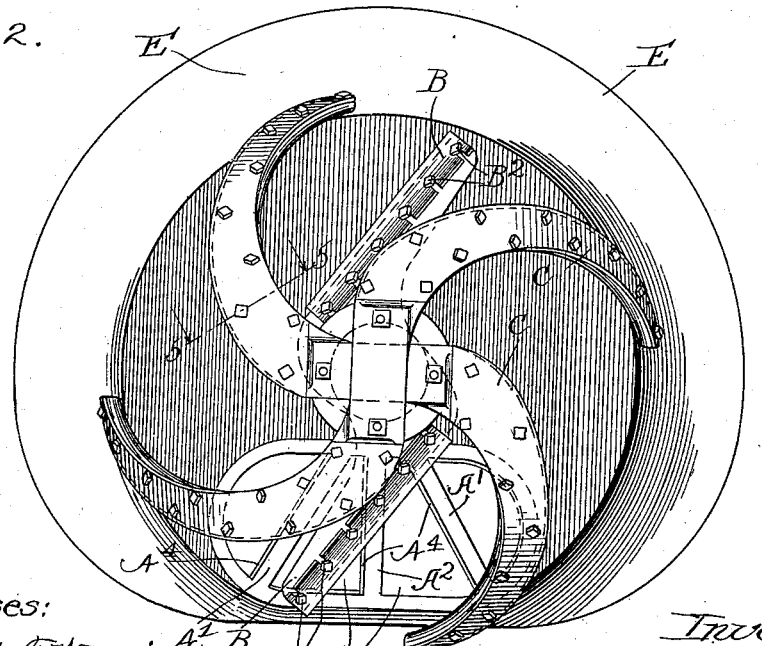
Figure 4:
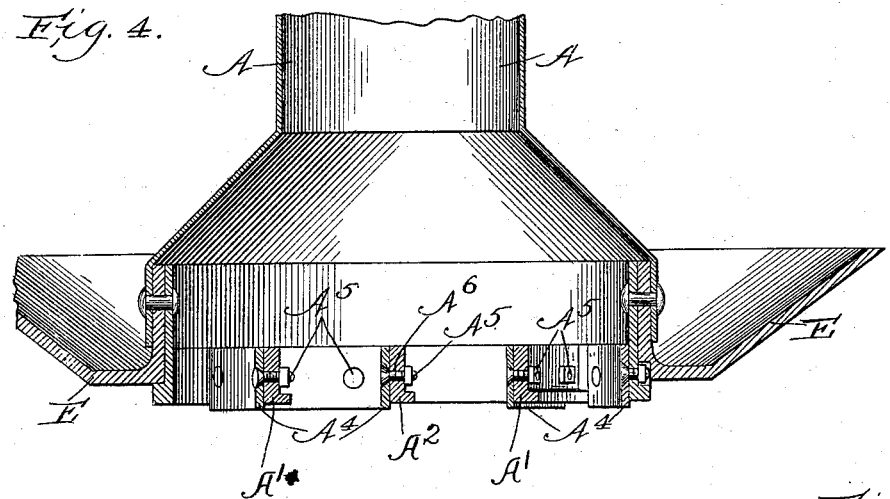
Figure 5:
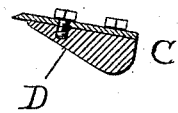
Figure 3:
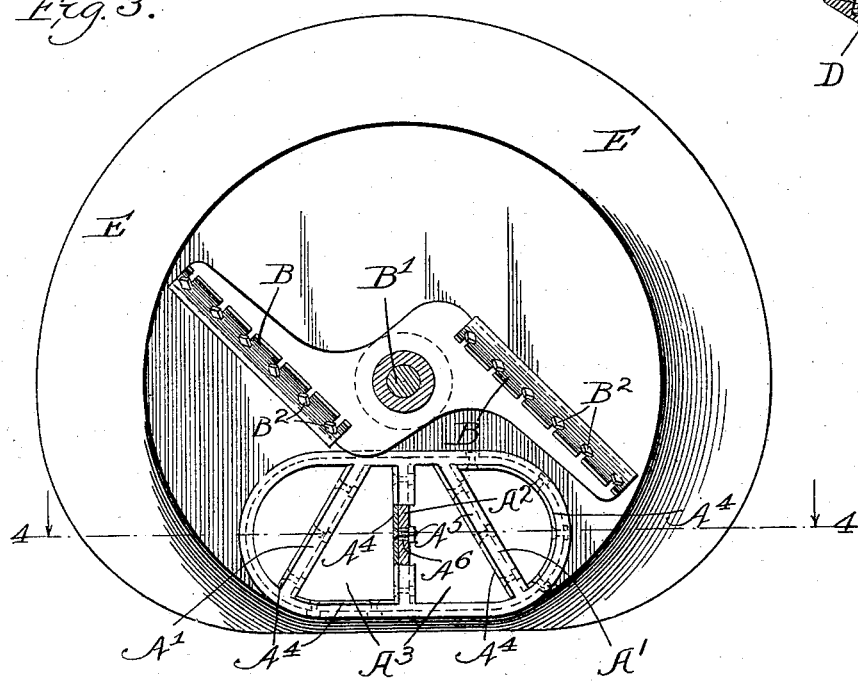

Figure 1 is a side view of a device embodying my invention. Fig. 2 is a front view of Fig. 1. Fig. 3 is a section on line 3 3, Fig. 1. Fig. 4 is a section on line 4 4, Fig. 3. Fig. 5 is a section on line 5 5, Fig. 2.

Like letters refer to like parts throughout the several figures.

I have illustrated in the drawings a cutting or stirring device particularly adapted to be used in connection with suction-dredges, and I have shown the device mounted in operative relation with the suction-pipe A. This suction-pipe is connected with the dredge in any suitable manner and is provided with any suitable means by which the material to be removed by the dredge is drawn up through the pipe. I have not shown the construction of the dredge proper or any of the associated parts, for the reason that such dredge is no part of my present invention and for the further reason that my device may be employed in connection with any suitable coöperating parts. The end of the suction-pipe A may be formed in any desired manner and, as illustrated in the drawings, is provided with the grating or bars A' A², said grating or bars arranged so as to divide the opening in the pipe into a series of openings A³. It is of course evident that these bars may be located in any desired position and that any number of bars desired may be used. I have shown three such bars, the bars A' being in an angular position and extending across the opening in the pipe at an angle of, say, forty-five degrees and the bars A² extending straight across the opening, as shown. These bars are provided with suitable cutting edges A⁴. As illustrated in the drawings, these cutting edges are of hardened steel and are preferably adjustably connected with said bars. It is of course evident that any suitable cutting edges may be employed and that they may be arranged in any desired manner. As illustrated in the drawings, the cutting edges are attached to the bars by means of suitable bolts or the like A⁵, the knives being adjustably connected with the bars—as, for example, by means of the enlarged holes A⁶. Associated with the end of the suction-pipe A are the cutters B, rotatably mounted in any suitable manner in proximity to the opening in the end of the pipe. As illustrated in the drawings, said cutters are connected with the shaft B', which is given a rotary motion by suitable mechanism on the dredge. The cutters B are thus moved in front of the end of the suction-pipe A and are so positioned as to cut up any sticks, grass, roots, lumps of clay, or other obstructions that might tend to clog up the openings in the pipe. These cutters B may be of any suitable construction and, as shown in the drawings, are provided with adjustable cutting edges, the cutting edges being held in place by means of suitable holding devices—as, for example, the bolts B². I have illustrated two cutters in the drawings, but it is of course evident that any suitable number of cutters may be utilized. The cutters B are placed at a proper shearing angle, so that the cutting edges are at an angle to the direction of movement of the cutters. I have illustrated these cutters in the drawings as being substantially at an angle of forty-five degrees to the line of movement. By the use of this construction I am enabled to dredge in tangled masses of vegetable growth or in places where obstructing devices are encountered which would ordinarily plug up the suction-pipe and render the device inoperative, the cutters B cutting or breaking these obstructing devices and allowing them to pass freely through the suction-pipe. Associated with the end of the suction-pipe is a cutting or stirring device C, movably mounted in proximity to said pipe in any suitable manner, as by being connected to the shaft B'. This cutting or stirring device is adapted to loosen or agitate, as it were, the material to be removed by the dredge, thus freeing it and allowing it to be drawn through the suction-pipe A. As illustrated in the drawings, the cutting or stirring device C consists of a series of blades located at a suitable distance from the end of the pipe, the blades being curved back toward the pipe, the cutting edges of these blades being also curved, so that the cutting edges will be at an angle with a tangent to the circle of rotation. This angle may of course be varied in accordance with the conditions to be met, and, as shown in the drawings, is approximately forty-five degrees. This construction gives a better cutting or shearing action and also allows obstructions—such, for example, as grass or roots—to slide from the cutting edges and become freed from the device, thus removing the difficulty of having these obstructions carried around by the rotation of the cutters, as would be the case if the cutting edges were at right angles to the tangent of the circle of rotation. This cutting or stirring device may be of any suitable construction and may be attached to the shaft B' in any suitable manner. As herein illustrated, the inner ends of the blades of the cutting or stirring device are attached to the shaft B', the blades themselves being self-supporting—that is, having sufficient rigidity to support themselves in their proper relative position without the aid of intervening supports, which might obstruct their free operation. The blades of said cutting or stirring device have a double curvature, as it were, and inclose a substantially hemispherical figure, the length of the device being sufficient to enable the cutting edges to remove a sufficient amount of material when the device is in operation. These blades are beveled on their inner surface, as shown at D, this beveled portion being at such an angle as to throw the material toward the mouth of the suction-pipe.

The entire device is moved along in its operation by any suitable means and cuts or stirs the material to be removed, so that it may be drawn through the suction-pipe A. I prefer to provide a suitable shield E back of the cutting or stirring device, as illustrated in the drawings, said shield serving to catch the material which might otherwise be carried out of range of the suction-pipe, and thus be lost.

The cutters B may of course be omitted when the device is used in dredging material free from obstructions which would clog the suction-pipe A.

I have illustrated in the drawings a particular form of my device in order to make its application clear; but it is of course evident that the several parts may be varied in form, construction, and arrangement without departing from the spirit of my invention, and I therefore do not wish to be limited to the construction shown.

I claim—

1. The combination with a suction-pipe of a cutting or stirring device in proximity to the end thereof, comprising a series of blades supported at their inner ends only, said blades curved back toward the suction-pipe and additionally curved away from their direction of rotation, so that their cutting edges are at an angle to the tangent of the circle of rotation, thus forming blades with a double curvature.

2. The combination with a suction-pipe of a cutting or stirring device movably mounted in proximity to the end of said suction-pipe, said cutting or stirring device comprising a series of blades projecting from a common center, said blades supported at their inner ends only and gradually curving backwardly toward the end of the suction-pipe and simultaneously curving away from their direction of rotation.

3. A dredging device, comprising a suction-pipe, a cutting or stirring device movably mounted in proximity to the end of said suction-pipe, said cutting or stirring device comprising a series of blades supported at their inner ends only having their ends bent back toward the suction-pipe, said blades being curved so that their cutting edges form an acute angle with the tangent to the circle of rotation at certain given points.

4. A dredging device, comprising a suction-pipe, a cutting or stirring device movably mounted in proximity to the end of said suction-pipe, said cutting or stirring device comprising a series of blades supported at their inner ends only having their ends bent back toward the suction-pipe, said blades curved so that their cutting edges form an angle of approximately forty-five degrees with the tangent to the circle of rotation at certain given points.

5. A dredging device, comprising a suction-pipe, a cutting or stirring device in proximity to the end of said suction-pipe for loosening the material to be passed through the suction-pipe, one or more bars extending across the mouth of said suction-pipe and provided with cutting edges, a movable part between said cutting or stirring device and the mouth of said pipe, said movable part adapted to coöperate with the cutting edges of said bar or bars so as to break up obstructing material at the mouth of the pipe.

6. A dredging device, comprising a suction-pipe provided at its mouth with one or more cutting edges, a movable device in proximity to the mouth of said pipe and adapted to be moved thereacross, a shaft to which the movable device is attached, said shaft substantially parallel with the suction-pipe, said movable device adapted to engage obstructing material at the mouth of the pipe and move it in contact with said cutting edge or edges, thus breaking the obstructing material up so that it may pass through the pipe.

7. A dredging device, comprising a suction-pipe, a cutting or stirring device in proximity to the end thereof and adapted to loosen the material to be removed, a movable part between said cutting or stirring device and the mouth of the pipe adapted to break up obstructing material at the mouth of the pipe and allow it to pass therethrough, said movable part being no part of the cutting or stirring device.

8. As an article of manufacture, a cutting or stirring device, comprising a series of blades supported at their inner ends only adapted to be rotated about an axis, a portion of each of said blades being bent to one side, said blades being curved so that their cutting edges are at an angle to the tangent of their circles of rotation.

9. A device to be used in connection with the suction-pipe of a dredge, comprising a cutting or stirring device movably mounted in proximity to the end of said suction-pipe, said cutting or stirring device comprising a series of blades having their ends bent back toward the suction-pipe, said blades being curved away from their direction of rotation, a movable part between said cutting or stirring device and the mouth of the suction-pipe, said movable part adapted to break up obstructing material at the mouth of said suction-pipe and allow it to pass therethrough.

10. A dredging device, comprising a suction-pipe, a cutting or stirring device movably mounted in proximity to the end of said suction-pipe, said cutting or stirring device comprising a series of blades bent toward the end of the suction-pipe and curved away from their direction of rotation, one or more cutting or shearing edges associated with said suction-pipe, one or more cutting or shearing blades between the suction-pipe and the cutting or stirring device and adapted to coöperate with said cutting or shearing edges so as to break up obstructions at the mouth of the suction-pipe.

11. The combination with a suction-pipe of one or more bars extending across the mouth thereof and provided with a cutting or shearing edge, one or more blades rotatably mounted in proximity to the mouth of said suction-pipe and adapted to coöperate with said cutting or shearing edge, said blade or blades being bent away from their direction of rotation, a cutting or stirring device rotatably mounted in proximity to the end of said suction-pipe and comprising a series of blades bent back toward the suction-pipe, said blades being curved away from their direction of rotation.

12. The combination with a suction-pipe of one or more bars extending across the mouth thereof, an adjustable cutting edge associated with said bar or bars and a cutting or shearing blade rotatably mounted in proximity to the mouth of said pipe and adapted to coöperate with the cutting or shearing edge on said bar or bars.

13. The combination with a suction-pipe of a cutting or stirring device in proximity to the end of said suction-pipe and comprising a series of blades projecting beyond the end of said suction-pipe and bent backwardly toward it and a laterally-projecting shield or the like associated with the mouth of said suction-pipe and adapted to obstruct the material loosened by said cutting or stirring device and prevent it from being carried out of range of the suction-pipe and one or more additional movable parts between said cutting or stirring device and said shield.

14. The combination with a suction-pipe of a cutting or stirring device in proximity to the end of said suction-pipe, comprising a series of self-supporting blades fastened to the end of a shaft projecting beyond the end of the suction-pipe, said blades curved backwardly toward the suction-pipe, the spaces between the blades being unobstructed so as to permit the material to pass freely therethrough.

15. A dredging device, comprising a suction-pipe open at its outer end, said open end provided with one or more cutting edges, a shaft running lengthwise along said suction-pipe, a shearing-blade mounted on said shaft and adapted to be moved past the open end of said suction-pipe when the shaft is rotated, so as to engage the obstructing material at the mouth of the pipe and move it in contact with said cutting edge or edges.

ARTHUR W. ROBINSON.

Witnesses:
 DONALD M. CARTER,
 HOMER L. KRAFT.